(12) United States Patent
Altrichter et al.

(10) Patent No.: US 8,140,317 B2
(45) Date of Patent: Mar. 20, 2012

(54) DEVICE SIMULATION METHOD AND SYSTEM

(75) Inventors: Ralf Altrichter, Filderstadt (DE); Oliver Augenstein, Weil im Schoenbuch (DE); Hans-Ulrich Oldengott, Jettingen (DE)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 12/171,342

(22) Filed: Jul. 11, 2008

(65) Prior Publication Data
US 2010/0010799 A1     Jan. 14, 2010

(51) Int. Cl.
*G06F 13/10* (2006.01)
(52) U.S. Cl. ............................................. 703/21; 703/25
(58) Field of Classification Search ................ 703/7, 21, 703/25, 13, 23; 710/16, 62; 713/330; 455/557
See application file for complete search history.

(56) References Cited

U.S. PATENT DOCUMENTS

| 2003/0023791 | A1* | 1/2003 | Suzuki et al. ................. 710/62 |
| 2004/0236564 | A1* | 11/2004 | Oshins et al. .................. 703/25 |
| 2004/0250150 | A1* | 12/2004 | Swoboda et al. ............. 713/330 |
| 2005/0160199 | A1* | 7/2005 | Tasler ............................ 710/16 |
| 2006/0080389 | A1 | 4/2006 | Powers et al. |
| 2009/0075697 | A1* | 3/2009 | Wilson et al. ................. 455/557 |
| 2009/0089031 | A1* | 4/2009 | Sturrock et al. .................. 703/7 |
| 2009/0281783 | A1* | 11/2009 | Bitar et al. ....................... 703/21 |

* cited by examiner

*Primary Examiner* — Kandasamy Thangavelu
(74) *Attorney, Agent, or Firm* — Matthew B. Talpis; Gregory K Goshorn; Greg Goshorn, P.C.

(57) ABSTRACT

A simulation method and system. The method includes receiving by a simulation engine in a device driver, input simulation parameters data associated with a simulation process. The simulation engine calculates a simulated scaled down process time period for a device associated with the device driver. The simulation engine simulates the device. The simulation engine calculates an overall runtime period for the device. The overall runtime period is calculated based on the simulated scaled down process time period. The simulation engine transmits the overall runtime period to a simulator software application for generating an operating schedule for operating the device.

20 Claims, 5 Drawing Sheets

DEVICE SIMULATION METHOD AND SYSTEM

FIELD OF THE INVENTION

The present invention relates to a method and associated system for performing a simulation process for a device.

BACKGROUND OF THE INVENTION

Generating apparatus related data typically comprises an inaccurate process with little flexibility. Accordingly, there exists a need in the art to overcome at least some of the deficiencies and limitations described herein above.

SUMMARY OF THE INVENTION

The present invention provides a simulation method comprising:

receiving, by a first simulation engine from a simulator software application, first input simulation parameters data associated with a first simulation process, wherein said first simulation engine is located within a first device driver, wherein said first device driver comprises first runtime behavior data associated with said first device driver;

receiving, by said first simulation engine, first device specific parameters data for a first device associated with said first device driver;

first calculating in response to said receiving said first input simulation parameters data and said receiving said first device specific parameters data, by said first simulation engine, a first simulated scale down process time period for said first device, wherein said first calculating is based on said first device specific parameters data, said first input simulation parameters data, and said first runtime behavior data;

after said first calculating, first disabling by said simulation engine, communications between said first simulation engine and said simulator software application, wherein said first disabling is executed during said first simulated scale down process time period;

simulating, by said first simulation engine, said first device;

calculating, by said first simulation engine during said simulating said first device, a first overall runtime period for said first device, wherein said calculating said first overall runtime period is based on said first simulated scale down process time period;

after said first simulated scale down process time period has expired, enabling by said first simulation engine, said communications between said first simulation engine and said simulator software application; and transmitting, by said first simulation engine, said first overall runtime period to said simulator software application for generating an operating schedule for operating said first device.

The present invention provides a computing system comprising a processor coupled to a computer-readable memory unit, said memory unit comprising instructions that when executed by the processor implements a simulation method, said method comprising:

receiving, by a first simulation engine from a simulator software application, first input simulation parameters data associated with a first simulation process, wherein said first simulation engine is located within a first device driver, wherein said first device driver comprises first runtime behavior data associated with said first device driver;

receiving, by said first simulation engine, first device specific parameters data for a first device associated with said first device driver;

first calculating in response to said receiving said first input simulation parameters data and said receiving said first device specific parameters data, by said first simulation engine, a first simulated scale down process time period for said first device, wherein said first calculating is based on said first device specific parameters data, said first input simulation parameters data, and said first runtime behavior data;

after said first calculating, first disabling by said simulation engine, communications between said first simulation engine and said simulator software application, wherein said first disabling is executed during said first simulated scale down process time period;

simulating, by said first simulation engine, said first device;

calculating, by said first simulation engine during said simulating said first device, a first overall runtime period for said first device, wherein said calculating said first overall runtime period is based on said first simulated scale down process time period;

after said first simulated scale down process time period has expired, enabling by said first simulation engine, said communications between said first simulation engine and said simulator software application; and transmitting, by said first simulation engine, said first overall runtime period to said simulator software application for generating an operating schedule for operating said first device.

The present invention advantageously provides a simple method and associated system capable of generating apparatus related data.

DETAILED DESCRIPTION OF THE INVENTION

Figure 1:
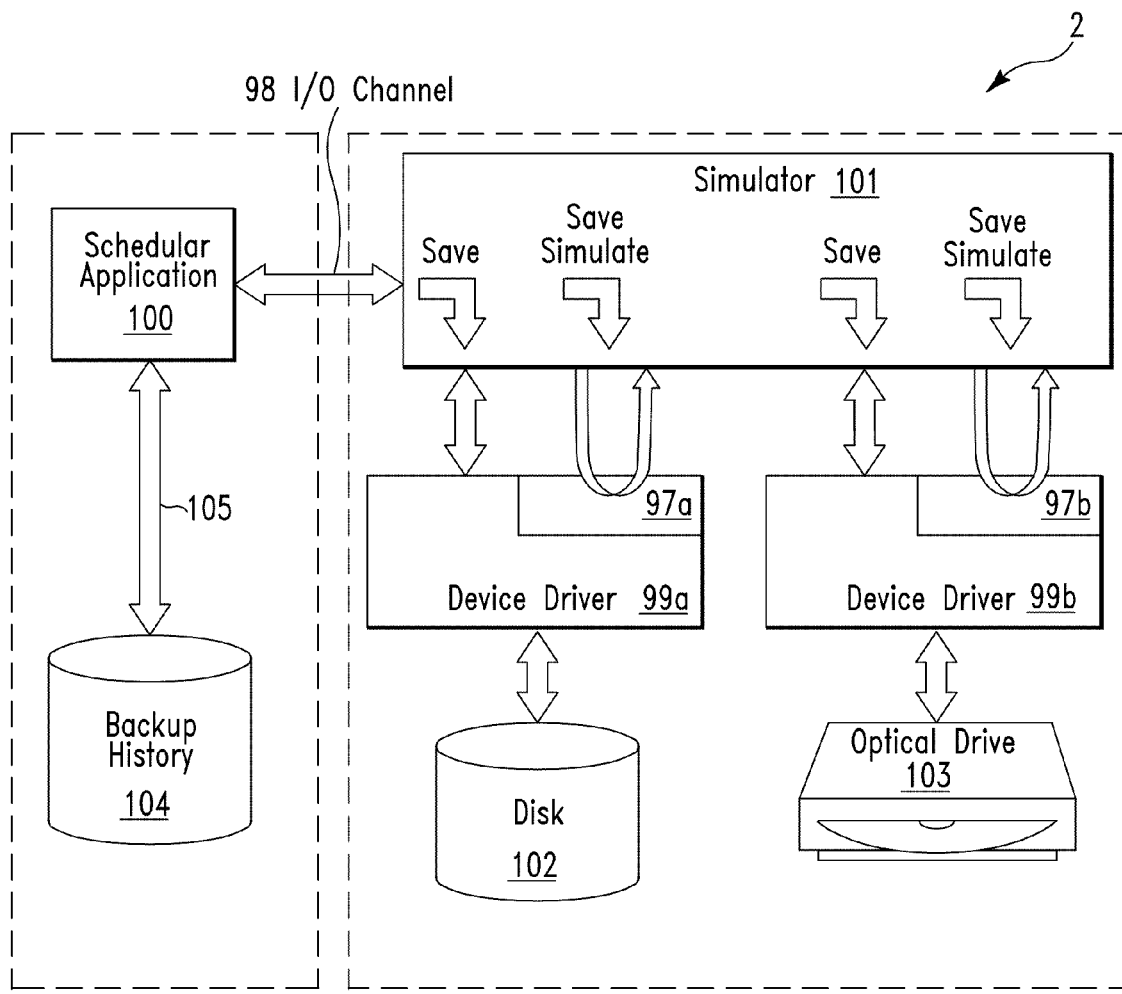
FIG. 1 illustrates a system for simulating job schedules for input/output (I/O) devices, in accordance with embodiments of the present invention.

FIG. 1 illustrates a system 2 for simulating job schedules for input/output (I/O) devices, in accordance with embodiments of the present invention. I/O devices may comprise any type of I/O devices including, inter alia, memory devices (disk drives, flash memory, tapes, etc), display devices, printers, a CPU, etc. System 2 allows users to forecast job schedules in a scaled down timeframe using backend devices required during the forecast run in simulation mode. System 2 comprises a scheduler software application 100, a database 104, a simulator software application, which is labeled simply as simulator 101, device drivers 99a and 99b, a disk drive 102 (an I/O device), and an optical device 103 (an I/O device), Note that although FIG. 1 illustrates disk drive 102 and optical device 103 as I/O devices, any I/O devices may be used with the system of FIG. 1. Disk drive 102 is driven by device driver 99a and optical device 103 is driven by device driver 99b. Device driver 99a comprises an interface 97a and device driver 99bcomprises an interface 97b. Interfaces 97a and 97b are used to run disk drive 102 and optical device 103 in simulation mode based on simulation input parameters such as, inter alia:
1. A scale down factor (e.g., in seconds).
2. An amount of data to be processed (e.g., in megabytes).

Interface 97a comprises information associated with a standard behavior of disk drive 102 (e.g., information associated with a time period for initialization phase, an expected throughput rate, etc). Interface 97b comprises information associated with a standard behavior of optical drive 103 (e.g., information associated with a time period for initialization phase, an expected throughput rate, etc). Based on input (simulation) parameters (e.g., a scale down factor) and device related parameters (e.g., an initialization time, data transfer rates, etc), device driver 99a simulates disk drive 102 and driver 99b simulates optical drive 103. In order to perform a simulation process system 2 enables the following functions:
1. Scheduler software application 100 reads backup history data (i.e., backup statistical data from preceding backup runs) from database 104 via an interface 105. The backup history data provides an amount of data to be used for the simulation process.
2. Scheduler 100 calls (i.e., communicates with) simulator software application 101 via, a simulation interface (I/O)) channel 98 and provides an amount of data to be processed and a scale down factor (i.e., provided as user input).
3. Simulator 101 invokes interface 97a (i.e., a device driver extension) for disk drive 102 and interface 97b (i.e., a device driver extension) for optical drive 10).
4. Interface 97a (i.e., a device driver extension) for disk drive 102 simulates overall device (i.e., for disk drive 102) response times and returns to the caller upon success (i.e., without using disk drive 102).
5. Interface 97b (i.e., a device driver extension) for optical drive 103 simulates overall device (i.e., for optical drive 103) response times and returns to the caller upon success (i.e., without using optical drive 103).
6. Based on the returns to the caller simulated schedule may be generated thereby providing a realistic scaled down forecast of expected production workflow allowing for finding resource deadlocks in complex backup schedules.

System 2 allows scheduling software application 100 to forecast trial runs for usage of I/O devices (e.g., disk drive 102, optical drive 103, etc) used during a real production run. The I/O devices (e.g., disk drive 102, optical drive 103, etc) provide device driver extensions (e.g., interface 97a, interface 97b, etc) which allow interaction with I/O devices in a simulation mode. Device drivers 99a and 99b accept as input parameters an amount of data to be archived and a scale down factor. The I/O devices simulate usage based on the input parameters in device drivers 99a and 99b only without any physical interaction with I/O devices. Scheduler software application 100 calls a device driver in simulation mode and offers input data to be used during simulation. This data (e.g. a scale down factor for the simulation run) together with device driver simulation parameters is used to simulate device usage. The simulation process takes place in the device driver only. Using many different I/O devices in an overall backup cycle, each device in its simulation mode will behave as in real production but in a scaled down timeframe. A scale down factor (e.g., 1/10) is provided by scheduler software application 100 as an input parameter to the device drivers 99a and 99b. A 1/10 scale down factor specifies that the device driver (e.g., device driver 99a or 99b) has to simulate its response time 10 times faster than in a real production mode. Each I/O device knows its own response times (e.g., a mount time, transfer rates, an un-mount time, etc). A scale down factor may be different for different simulations but is identical for all I/O devices in a same simulation run. This results in consistent behavior of all I/O devices in an overall simulation run. System 2 allows scheduler software application 100 to forecast the real production for:
1. An overall duration of a schedule in minutes or seconds.
2. Potential resource deadlocks (occupied by different applications).
3. Replacing, adding, or removing I/O devices with out any changes in a simulation configuration.

System 2 comprises device drivers (e.g., device driver 99a and device driver 99b) each comprising:
1. An interface (e.g., interface 97a and interface 97b) for accepting input simulation parameters such as, inter alia:
   A. Amount of data to be processed (e.g. megabytes).
   B. A scale down factor for a simulation run (e.g. a percentage).
2. A set of device specific parameters related to the device (e.g., disk drive 102, optical drive 103, etc) such as, inter alia:
   A. Device initialization time (e.g., tape mount time, hard disk ramp up time, etc).
   B. Data transfer rates.
3. A logical program extension using the input simulation parameters and the device specific parameters to calculate the simulated scaled down process duration or simulated device response time for a specific operation.

The following example 1 illustrates an implementation example for using a physical device such as a tape drive in real time.

EXAMPLE 1

Mount time=10 sec
Data transfer rate=100 MB/sec
Amount of Data=1 GB
Real overall response time 10 sec (mount time)+10 sec (data transfer rate)=20 seconds.

The following example 2 illustrates an implementation example for using a physical device such as a tape drive in simulation mode with device driver extension.

EXAMPLE 2

Mount time=10 sec
Data transfer rate=100 MB/sec
Amount of Data=1 GB
Scale down factor=10%
Real overall response time 1 sec (mount time)+1 sec (data transfer rate)=2 seconds.

Figure 2:
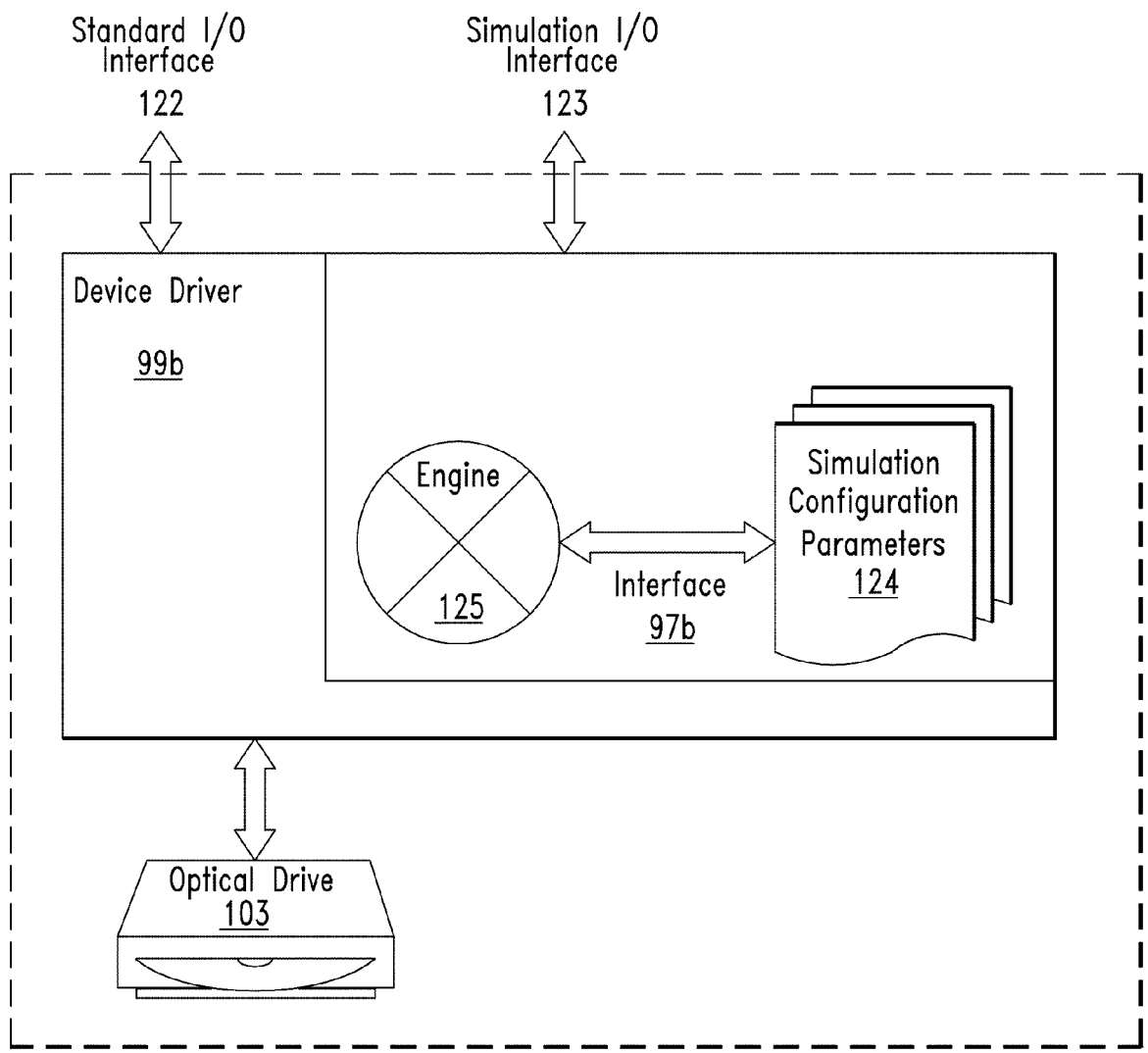
FIG. 2 illustrates a detailed view of the device driver of FIG. 1, in accordance with embodiments of the present invention.

FIG. 2 illustrates a detailed view of device driver 99b of FIG. 1, in accordance with embodiments of the present invention. Device driver 99b comprises a standard I/O interface 122 and a simulation interface 123. Interface 97b comprises a simulation engine 125 and a simulation configuration parameters file 124. Simulation interface 123 invokes simulation engine 125 and in response, simulation engine 125 reads a portion of simulation configuration parameters file 124 directly related to a specific device (i.e., optical drive 103). Simulation configuration parameters file 124 comprises different parameters for different devices. The following list describes examples of simulation configuration parameters:
1. A ramp up or mount time in seconds.
2. An average transfer rate in MB/second.
3. A cool down or un-mount time in seconds.

Based on the device related simulation parameters and the given input parameters (e.g., amount of data, a scale down factor, etc), the device (e.g., optical drive 103) behaves as it would behave in real time but in a scaled down timeframe. A scale down factor is applied to any parameters in simulation configuration parameters file 124. During a simulation process, simulation engine 125 performs a sleep operation for each simulation step. After completion of all simulation steps, interface 97b returns to the caller.

Figure 3:
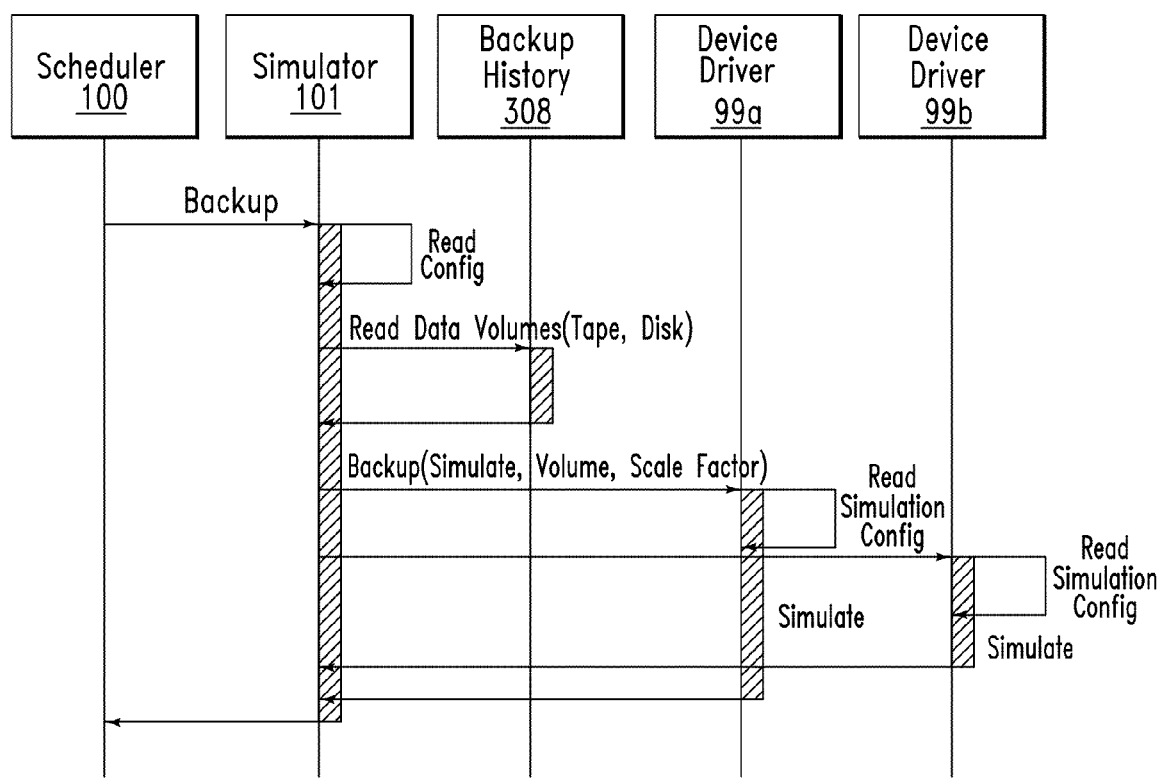
FIG. 3 illustrates a flowchart describing an algorithm used by the system of FIG. 1 for executing a backup simulation run, in accordance with embodiments of the present invention.

FIG. 3 illustrates a flowchart describing an algorithm used by system 2 of FIG. 1 for executing a backup simulation run, in accordance with embodiments of the present invention. In this case, the scheduler software application 100 initializes a backup simulation process. Scheduler software application 100 calls simulator software application 101 to retrieve configured simulation parameters (e.g., a scale down factor). Simulator software application 101 makes usage of historical data comprising preceding real backup runs and calls to real devices using a simulation interface of their device drivers 99a and 99b. Each device driver uses the scale down factor and an amount of data to be processed together with its own runtime behavior (e.g., an initialization time, a mount time, a throughput rate, etc) Each device driver blocks the caller until it's scaled down processing time has finished. Simulator software application 101 may then create a scaled down schedule using all blocking intervals of the used device drivers. Using different or more devices will change the resulting schedules and may be used to optimize the schedule time/resource consumption or to detect resource conflicts.

Figure 4:
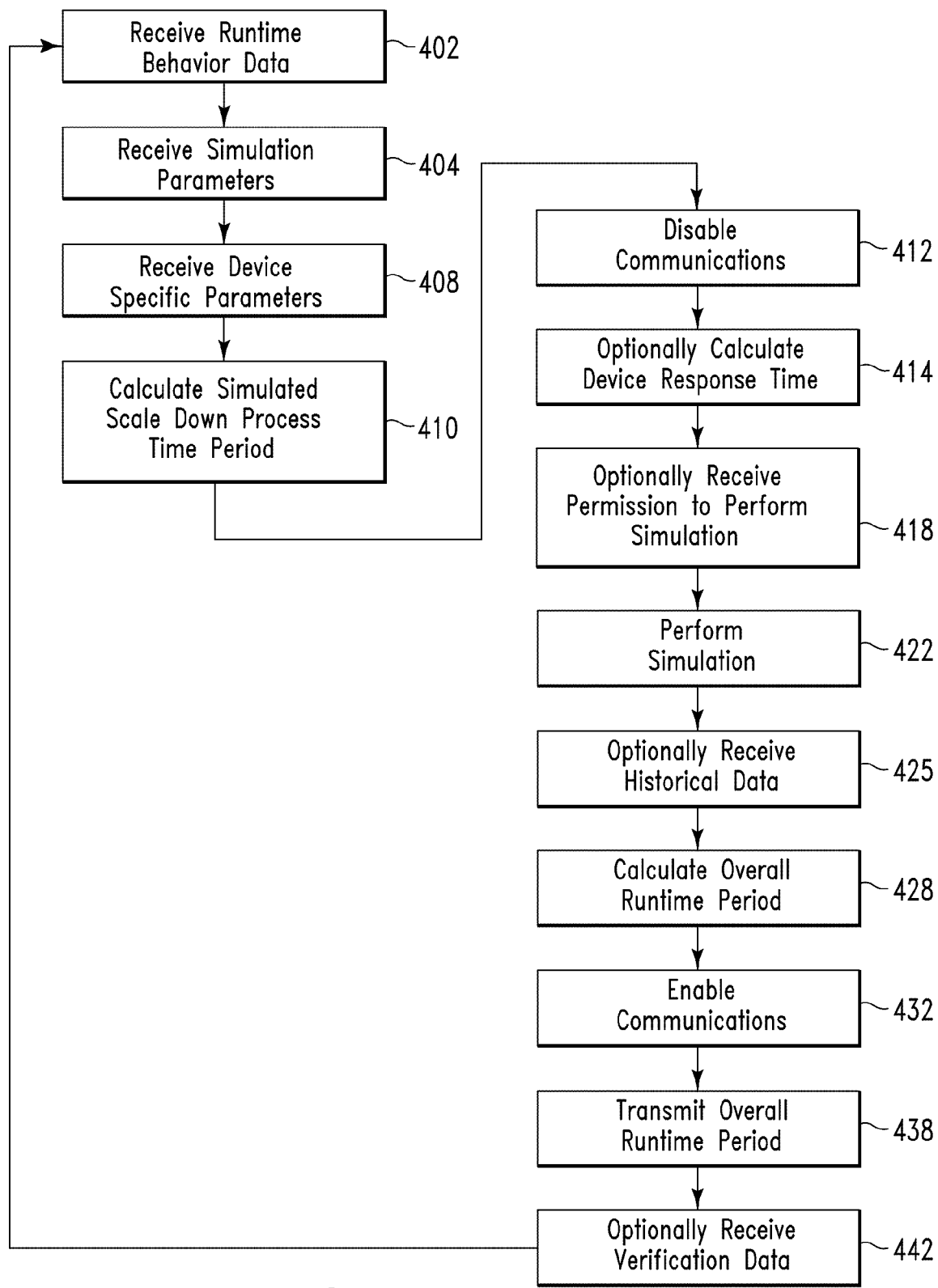
FIG. 4 illustrates a flowchart describing an algorithm used by the system of FIG. 1 for simulating job schedules for input/output (I/O) devices, in accordance with embodiments of the present invention.

FIG. 4 illustrates a flowchart describing an algorithm used by system 2 of FIG. 1 for simulating job schedules for input/output (I/O) devices, in accordance with embodiments of the present invention. In step 402, a simulation engine (e.g., simulation engine 125 in FIG. 2) in an interface (e.g., interface 97b in FIG. 2) located in a device driver (e.g., device driver 99b in FIG. 2) receives runtime behavior data associated with the device driver. In step 404, the simulation engine receives input simulation parameters data associated with a simulation process from a simulator software application (e.g., simulator 101 in FIG. 2). In step 408, the simulation engine receives device specific parameters data for a device (e.g., optical drive 103) associated with the device driver. In step 410, the simulation engine calculates (i.e., in response to receiving the input simulation parameters data and the device specific parameters data) a simulated scale down process time period for the device. The calculation for the simulated scale down process time period is based on the device specific parameters data, the input simulation parameters data, and the runtime behavior data. In step 412, the simulation engine disables communications between the simulation engine and the simulator software application. Step 412 is executed during the simulated scale down process time period. In optional step 414, a device response time for a specific operation associated with the device is calculated. In optional step 418, permission to perform a simulation is received by the simulation engine. The permission may be received from an administrator. In step 422, the simulation engine performs the simulation process. In optional step 425, the simulation receives data comprising historical information associated with past operations of the device. In step 428, simulation engine (i.e., during simulation process) calculates an overall runtime period for the device. The calculation for the overall runtime period is based on the simulated scale down process time period and optionally the historical information optionally received in step 425. In step 432, (i.e., after the simulated scale down process time period has expired) the simulation engine enables communications between the simulation engine and the simulator software application. In step 438, simulation engine transmits the overall runtime period to the simulator software application for generating an operating schedule for operating the device. In optional step 442, verification data (i.e., specifying that the simulator software application has received the overall runtime period) may be received by the simulation engine. The process may be repeated for different devices.

Figure 5:
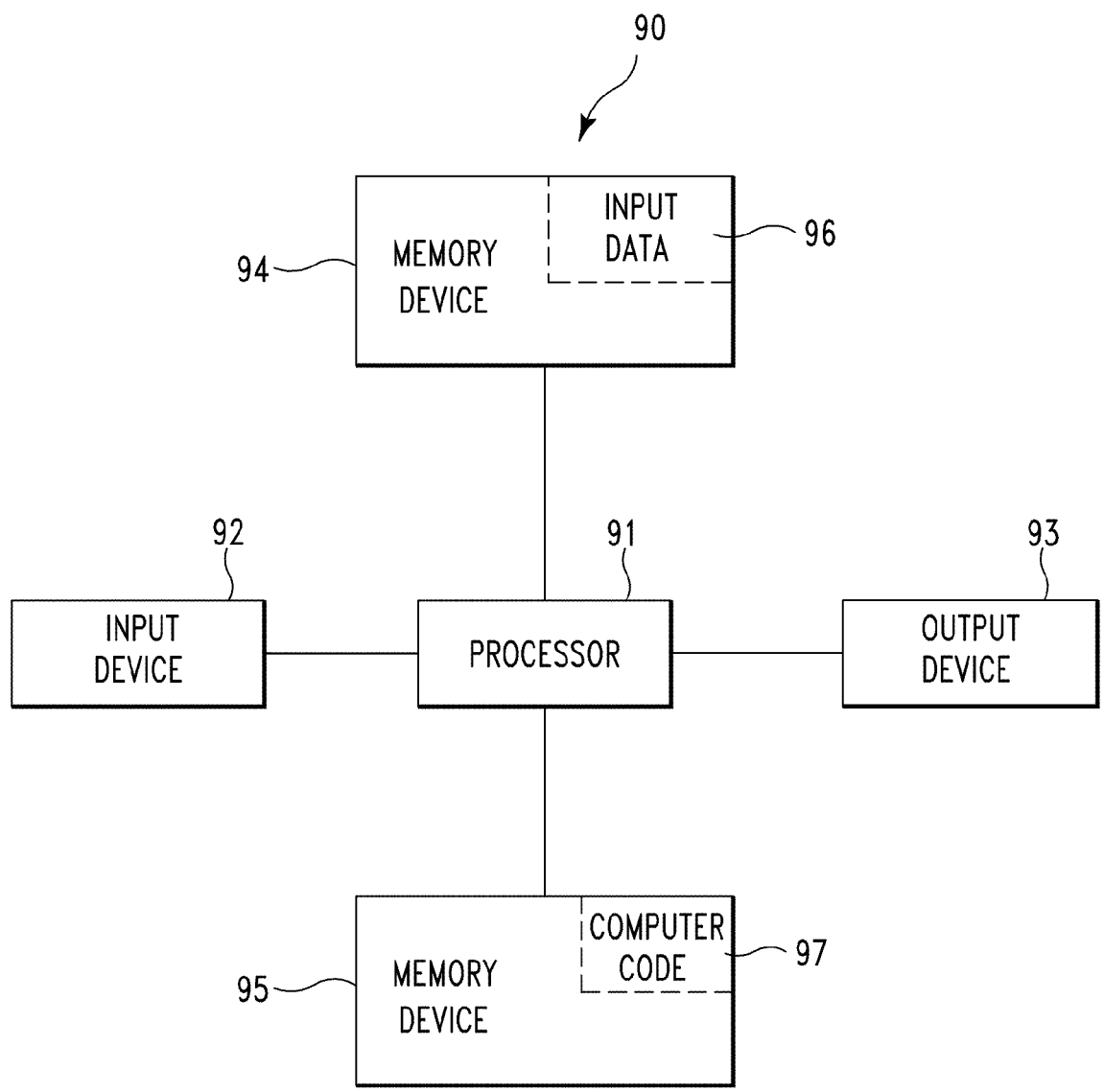
FIG. 5 illustrates a computer apparatus used for simulating job schedules for input/output (I/O) devices, in accordance with embodiments of the present invention.

FIG. 5 illustrates a computer apparatus 90 (e.g., computing system 10 of FIG. 1) used for simulating job schedules for input/output (I/O) devices, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3 and 4) for simulating job schedules for input/output (I/O) devices. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 3 and 4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to simulate job schedules for input/output (I/O) devices. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for simulating job schedules for input/output (I/O) devices. In another embodiment, the invention provides a business method that performs the process steps of the invention on a subscription, advertising, and/or fee basis. That is, a service provider, such as a Solution Integrator, could offer to perform a process for simulating job schedules for input/output (I/O) devices. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A simulation method comprising:
receiving, by a first simulation engine from a simulator software application, first input simulation parameters data associated with a first simulation process, wherein said first simulation engine is located within a first device driver, wherein said first device driver comprises first runtime behavior data associated with said first device driver;
receiving, by said first simulation engine, first device specific parameters data for a first device associated with said first device driver;
first calculating in response to said receiving said first input simulation parameters data and said receiving said first device specific parameters data, by said first simulation engine, a first simulated scaled down process time period for said first device, wherein said first calculating is based on said first device specific parameters data, said first input simulation parameters data, and said first runtime behavior data;
after said first calculating, first disabling by said simulation engine, communications between said first simulation engine and said simulator software application, wherein said first disabling is executed during said first simulated scaled down process time period;
simulating, by said first simulation engine, said first device;
calculating, by said first simulation engine during said simulating said first device, a first overall runtime period for said first device, wherein said calculating said first overall runtime period is based on said first simulated scaled down process time period, wherein the first overall time period takes into account blocking intervals corresponding to other devices used with the first device;
after said first simulated scaled down process time period has expired, enabling by said first simulation engine, said communications between said first simulation engine and said simulator software application; and
transmitting, by said first simulation engine, said first overall runtime period to said simulator software application for generating an operating schedule for operating said first device.

2. The method of claim 1, further comprising:
receiving, by a second simulation engine from said simulator software application, second input simulation parameters data associated with a second simulation process, wherein said second simulation engine is located within a second device driver, wherein said second device driver comprises second runtime behavior data associated with said second device driver, wherein said first device driver differs from said second device driver;
receiving, by said second simulation engine, second device specific parameters data for a second device associated with said second device driver, wherein said second device differs from said first device;
second calculating in response to said receiving said second input simulation parameters data and said receiving said second device specific parameters data, by said second simulation engine, a second simulated scaled down process time period for said second device, wherein said second calculating is based on said second device specific parameters data, said second input simulation parameters data, and said second runtime behavior data;
after said second calculating, second disabling by said simulation engine, communications between said second simulation engine and said simulator software application, wherein said second disabling is executed during said second simulated scaled down process time period;
simulating, by said first simulation engine, said second device;
calculating, by said second simulation engine during said simulating said second device, a second overall runtime period for said second device, wherein said calculating said second overall runtime period is based on said second simulated scaled down process time period, wherein the second overall time period takes into account blocking intervals corresponding to other devices used with the second device;
after said second simulated scaled down process time period has expired, enabling by said second simulation engine, said communications between said second simulation engine and said simulator software application; and
transmitting, by said second simulation engine, said second overall runtime period to said simulator software application for generating a modified operating schedule for operating said first device and said second device.

3. The method of claim 1, wherein said first input simulation parameters data comprises a scaled down factor for a simulation run associated with said first device.

4. The method of claim 1, further comprising:
third calculating in response to said first disabling, by said first simulation engine, a device response time for a specific operation associated with said first device.

5. The method of claim 4, wherein said first input simulation parameters data comprises an amount of device related data to be processed by said first device.

6. The method of claim 1, wherein said first device specific parameters data comprises an initialization time for said first device and data transfer rates associated with said first device.

7. The method of claim 1, wherein said simulating said first device comprises performing a sleep operation for each step of said simulating said first device.

8. The method of claim 1, further comprising:
receiving, by said first simulation engine from an external database, data associated with said first device, wherein said data comprises historical information associated with past operations of said first device, and wherein said calculating said first overall runtime period is further based on said data.

9. The method of claim 1, further comprising:
before said simulating, transmitting by said first simulation engine to a system administrator, a request for permission to perform said simulating; and
receiving, by said first simulation engine from said administrator in response to said request, said permission.

10. The method of claim 1, further comprising:
receiving, by said first simulation engine from said simulator software application in response to receiving said first overall runtime period, verification data indicating said receiving said first overall runtime period; and
disabling, by said first simulation engine, said simulating.

11. A computer program product, comprising a computer storage medium comprising a computer readable program code embodied therein, said computer readable program code configured to perform the method of claim 1 upon being executed by a processor of said computing system.

12. A computing system comprising a processor coupled to a computer-readable memory unit, said memory unit comprising instructions that when executed by the processor implements a simulation method, said method comprising:
receiving, by a first simulation engine from a simulator software application, first input simulation parameters data associated with a first simulation process, wherein said first simulation engine is located within a first device driver, wherein said first device driver comprises first runtime behavior data associated with said first device driver;
receiving, by said first simulation engine, first device specific parameters data for a first device associated with said first device driver;
first calculating in response to said receiving said first input simulation parameters data and said receiving, said first device specific parameters data, by said lust simulation engine, a first simulated scaled down process time period for said first device, wherein said first calculating is based on said first device specific parameters data, said first input simulation parameters data, and said first runtime behavior data;
after said first calculating, first disabling by said simulation engine, communications between said first simulation engine and said simulator software application, wherein said first disabling is executed during said first simulated scaled down process time period;
simulating, by said first simulation engine, said first device;
calculating, by said first simulation engine during said simulating said first device, a first overall runtime period for said first device, wherein said calculating said first overall runtime period is based on said first simulated scaled down process time period, wherein the first overall time period takes into account blocking intervals corresponding to other devices used with the first device;
after said first simulated scaled down process time period has expired, enabling by said first simulation engine, said communications between said first simulation engine and said simulator software application; and
transmitting, by said first simulation engine, said first overall runtime period to said simulator software application for generating an operating schedule for operating said first device.

13. The computing system of claim 12, wherein said method further comprises:
receiving, by a second simulation engine from said simulator software application, second input simulation parameters data associated with a second simulation process, wherein said second simulation engine is located within a second device driver, wherein said second device driver comprises second runtime behavior data associated with said second device driver, wherein said first device driver differs from said second device driver;
receiving, by said second simulation engine, second device specific parameters data for a second device associated with said second device driver, wherein said second device differs from said first device;
second calculating in response to said receiving said second input simulation parameters data and said receiving said second device specific parameters data, by said second simulation engine, a second simulated scaled down process time period for said second device, wherein said second calculating is based on said second device specific parameters data, said second input simulation parameters data, and said second runtime behavior data;
after said second calculating, second disabling by said simulation engine, communications between said second simulation engine and said simulator software application, wherein said second disabling is executed during said second simulated scaled down process time period;
simulating, by said first simulation engine, said second device;
calculating by said second simulation engine during said simulating said second device, a second overall runtime period for said second device, wherein said calculating said second overall runtime period is based on said second simulated scaled down process time period, wherein the second overall time period takes into account blocking intervals corresponding to other devices used with the second device;
after said second simulated scaled down process time period has expired, enabling, by said second simulation engine, said communications between said second simulation engine and said simulator software application; and
transmitting, by said second simulation engine, said second overall runtime period to said simulator software application for generating a modified operating schedule for operating said first device and said second device.

14. The computing system of claim 12, wherein said first input simulation parameters data comprises a scaled down factor for a simulation run associated with said first device.

15. The computing system of claim 12, wherein said method further comprises:
third calculating in response to said first disabling, by said first simulation engine a device response time for a specific operation associated with said first device.

16. The computing system of claim 14, wherein said first input simulation parameters data comprises an amount of device related data to be processed by said first device.

17. The computing, system of claim 12, wherein said first device specific parameters data comprises an initialization time for said first device and data transfer rates associated with said first device.

18. The computing system of claim 12, wherein said simulating said first device comprises performing, a sleep operation for each step of said simulating said first device.

19. The computing system of claim 12, wherein said method further comprises:
   receiving, by said first simulation engine from an external database, data associated with said first device, wherein said data comprises historical information associated with past operations of said first device, and wherein said calculating said first overall runtime period is further based on said data.

20. The computing system of claim 12, wherein said method further comprises:
   before said simulating, transmitting by said first simulation engine to a system administrator, a request for permission perform said simulating; and
   receiving, by said first simulation engine from said administrator in response to said request, said permission.

* * * * *